Dec. 24, 1940.  E. W. TAYLOR  2,226,361
COMBINATION CARGO AND MATERIAL HANDLING MACHINE
Filed Jan. 18, 1940  4 Sheets-Sheet 1
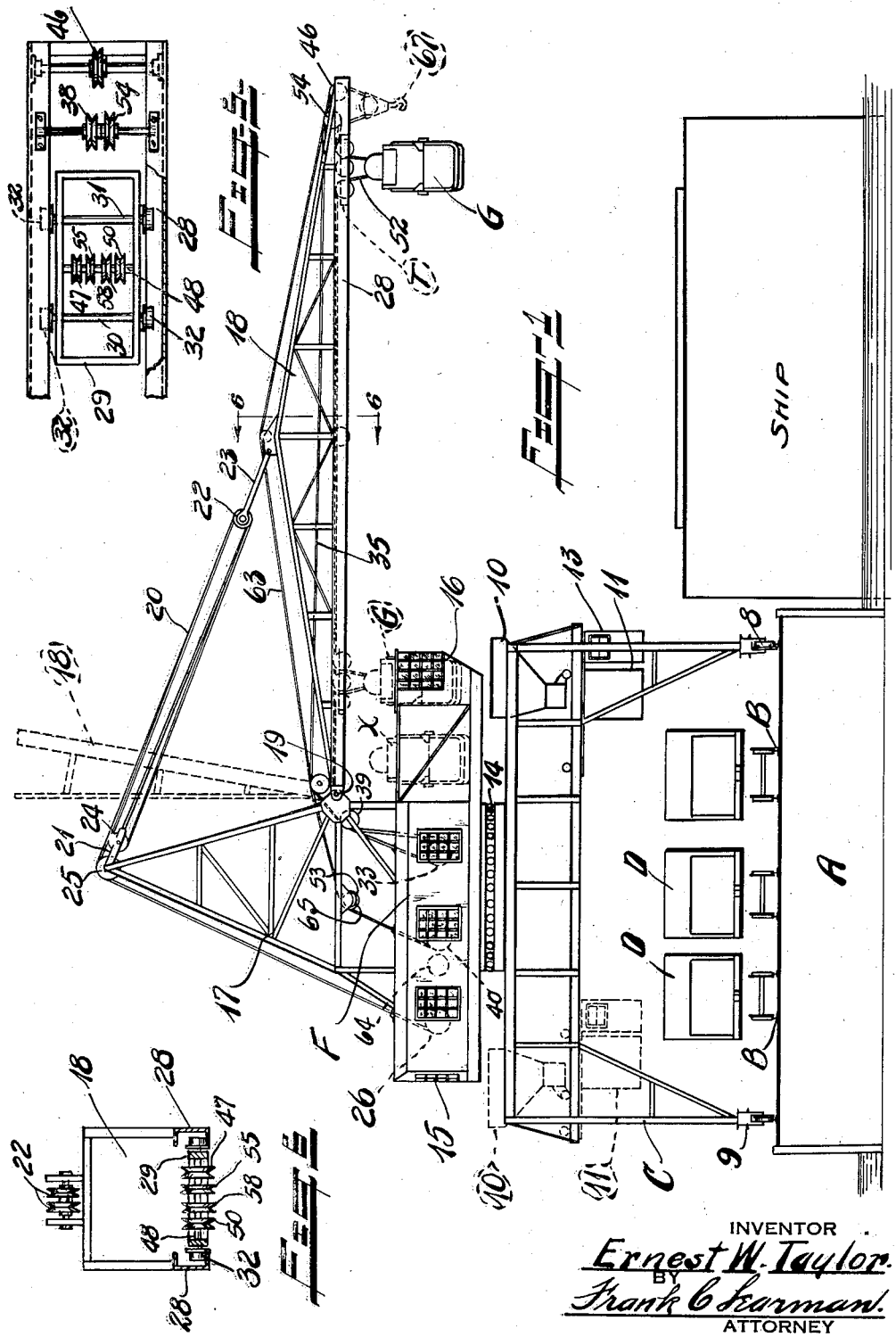
INVENTOR
Ernest W. Taylor
BY
Frank C. Fearman
ATTORNEY Dec. 24, 1940. E. W. TAYLOR 2,226,361
COMBINATION CARGO AND MATERIAL HANDLING MACHINE
Filed Jan. 18, 1940 4 Sheets-Sheet 2
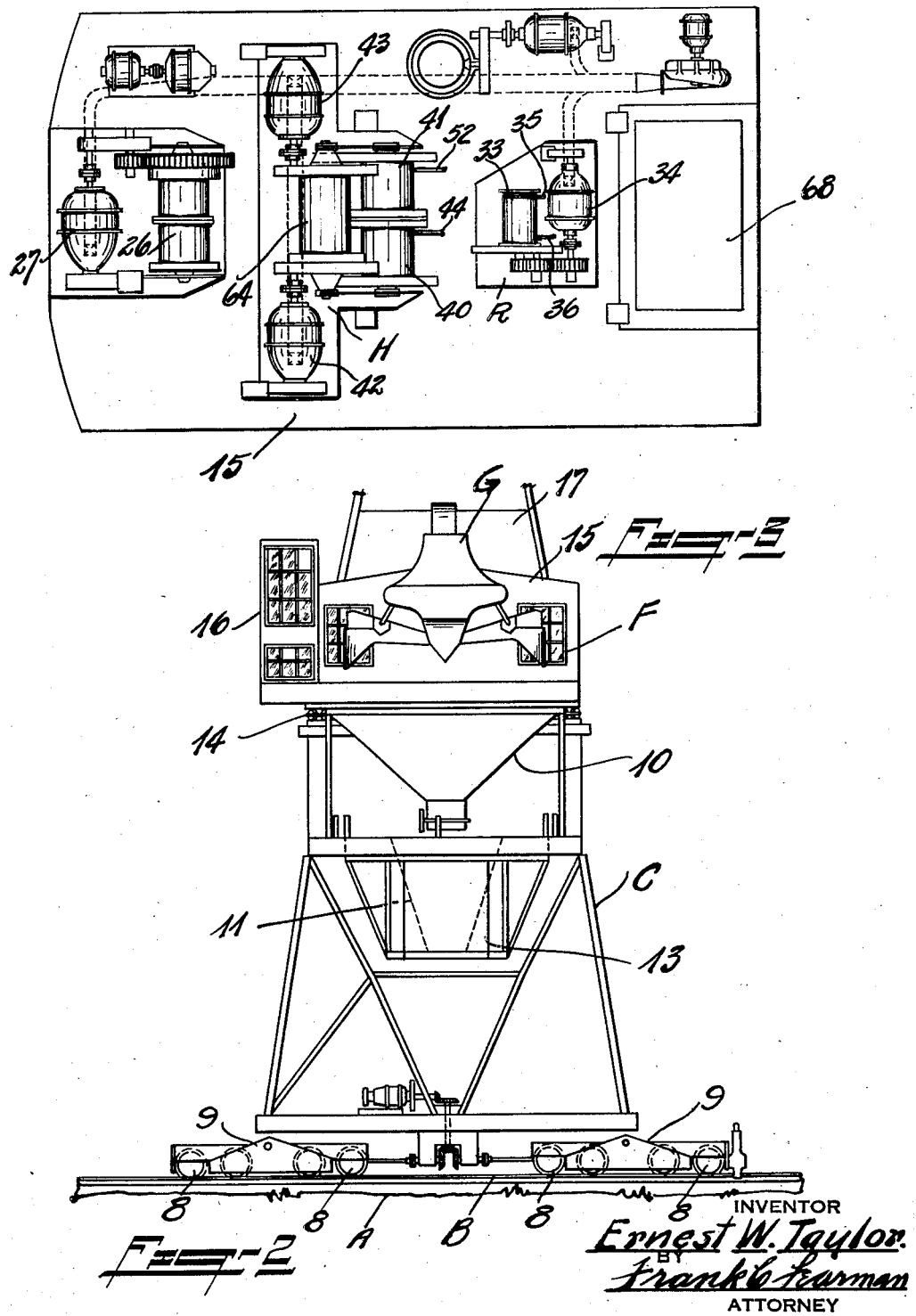
INVENTOR
Ernest W. Taylor.
BY Frank C. Farman
ATTORNEY

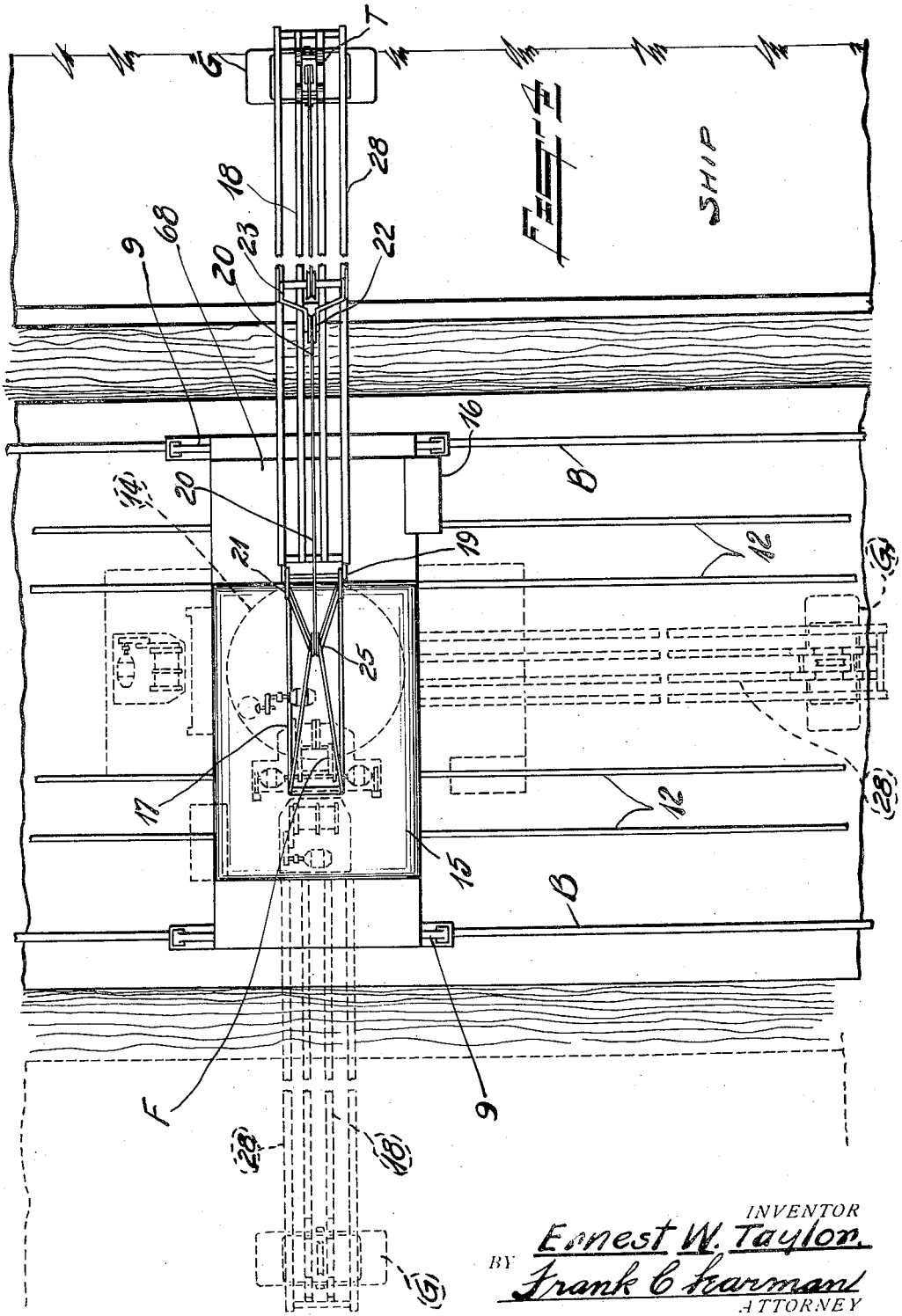

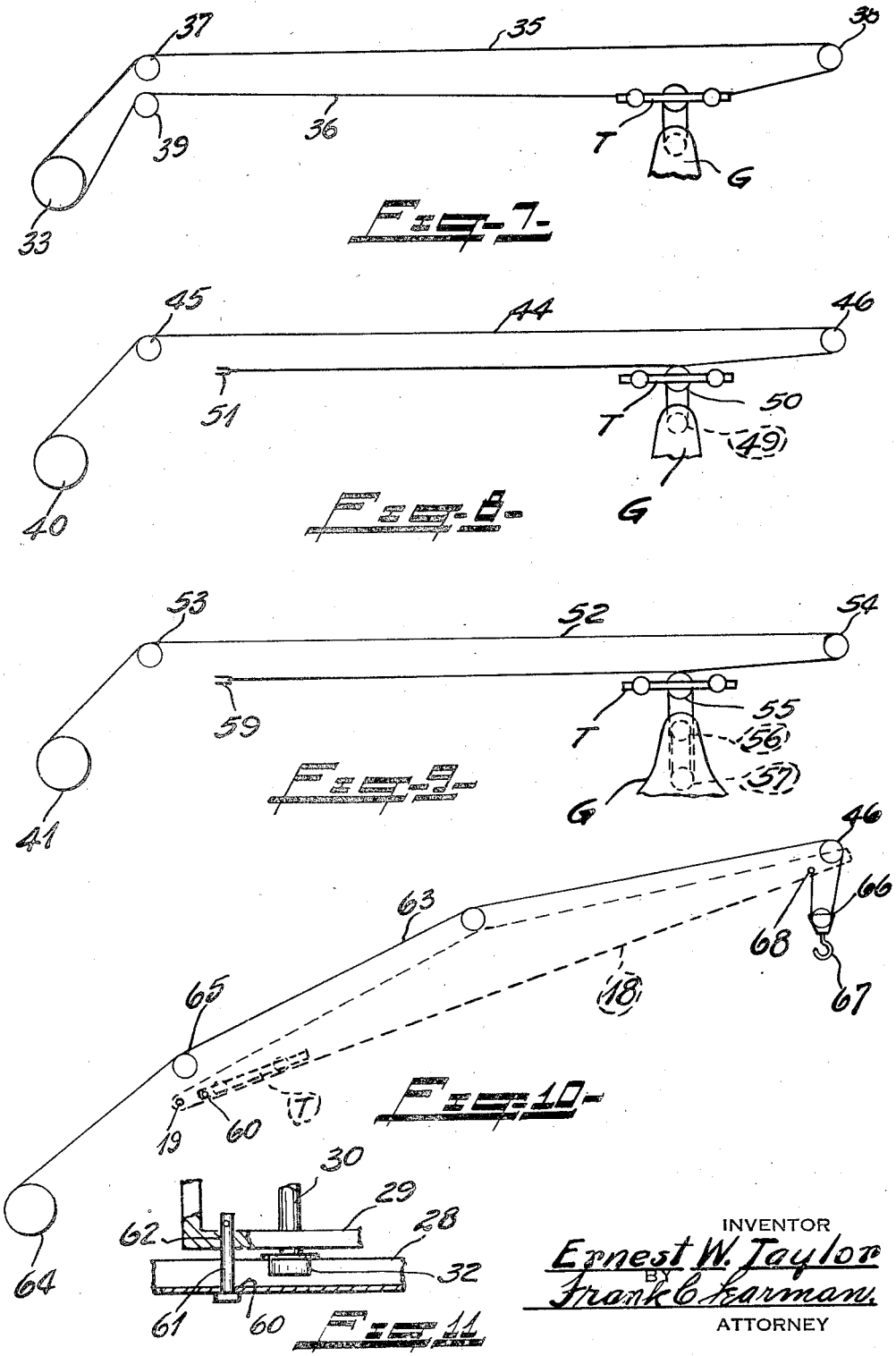

Patented Dec. 24, 1940

2,226,361

UNITED STATES PATENT OFFICE 2,226,361

COMBINATION CARGO AND MATERIAL HANDLING MACHINE

Ernest W. Taylor, Bay City, Mich., assignor to Industrial Brownhoist Corporation, Bay City, Mich., a corporation of Ohio Application January 18, 1940, Serial No. 314,382

4 Claims. (Cl. 212—5)

One of the prime objects of the invention is to provide a combination handling machine for handling all kinds of bulk materials of fragmentary, classification, as well as general cargo such as heavy machinery, structural steel, long timbers, and cargo of similar nature.

Another object is to design a mobile full revolving machine including a combination boom-track and trolley arrangement in which the boom can be used with a trolley and grab bucket arrangement for transferring bulk cargo such as ore, coal, and other fragmentary material into or out of a boat, car, or other receptacle, and which can be easily and quickly converted into a boom type crane or machine for handling a magnet, or general cargo, such as machinery, structural members and similar materials.

A further object is to provide a freely revolvable mobile machine adapted for installation on a dock or other supporting structure and so mounted that it can be readily moved to any desired location on the dock, so that it can operate, load, or unload from either side of said dock.

A still further object is to provide a supporting structure on which the material handling mechanism is mounted, and provide readily movable hoppers on said structure and into which the material is dumped for weighing and transfer to transfer cars located in proper position to receive it.

A further object still is to design a comparatively inexpensive, combination material handling machine which can be operated much faster than the conventional machines at present in general use, and which is readily convertible to quickly, economically, and effectively handle any class of cargo desired.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of my new convertible machine showing it mounted on a dock with a cargo vessel adjacent thereto, and also showing a number of transfer cars in position on the dock, the solid lines showing the machine using a grab bucket for handling fragmentary materials, the broken lines showing the boom raised for use as a boom crane with the grab bucket stowed on the revolvable superstructure.

Fig. 2 is an enlarged fragmentary and elevational view, the boom etc., being omitted.

Fig. 3 is an enlarged, horizontal, plan view showing the floor of the turntable and the mechanism mounted thereon.

Fig. 4 is a fragmentary top plan view, the broken lines showing the superstructure swung longitudinally of the dock and also to the opposite side of the dock.

Fig. 5 is an enlarged fragmentary plan of the boom showing the trolley, etc.

Fig. 6 is a transverse sectional view taken on the line 6—6 of Fig. 1.

Fig. 7 is a diagrammatic view illustrating the trolley travel ropes, and

Fig. 8 is a similar view illustrating the shell rope.

Fig. 9 is a diagrammatic view illustrating the closing rope system when the machine is used for handling bulk cargo.

Fig. 10 is a similar view of the rope system used when the structure is used as a boom type machine.

Fig. 11 is a fragmentary top plan view showing the manner of securing the trolley when the machine is used as a boom crane.

On a general cargo dock it is necessary to handle any material that can be shipped, either very heavy, bulky, or long objects or materials, or bulk material such as coal, scrap iron, ore, or other materials of a fragmentary classification.

The most practical, efficient, and economical machine for handling heavy loads such as machinery, structural steel, etc., is a boom type machine, because this type machine can be swung over the side of the supporting structure and there are no legs or other supports disposed in the path of the load as it is being lifted and swung; likewise, the most economical, best, and fastest type of machine for handling bulk cargo is a rope system trolley, handling a grab bucket with a straight line operation in which the boom is utilized as a track and is disposed over the material to be handled. With such arrangement the trolley is moved along the boom to transfer the load to a receiving hopper from which it is discharged into a traveling weighing hopper, which is then moved over a car or receptacle into which the material is dumped, after which the bucket is brought back to position over the material to be loaded, preparatory to grabbing the next load. Ordinarily, this embraces two distinct types of work handled by separate machines, but in the present instance, I have designed a combination machine which efficiently handles both types of work more quickly and efficiently, and with a distinct saving in time, labor, and at a minimum cost.

Referring now to the drawings in which I have shown the preferred embodiment of my invention, the dock structure is indicated at A, and spaced tracks rails B are provided thereon and accommodate the wheels 8 of equalizing trucks 9 which are movable on said tracks, said trucks forming a part of a supporting carriage C on which the receiving hopper 10 is positioned. A weigh hopper 11 is mounted for travel on this carriage C and is adapted to receive the material from the receiving hopper 10, and this loaded hopper is then moved to position over and is dumped into one of the transfer cars D which are operated on standard tracks 12 provided on the dock. An operator's house 13 is provided on the traveling weigh hopper 11 and operates on suitable tracks 13 provided on the carriage frame C as shown, and an operator is stationed therein and controls the weighing, dumping, and moving of the hopper as the material is transferred to the transfer cars.

A turntable 14 is mounted on the carriage frame C as shown and a full revolving operating machine F is mounted thereon in the conventional manner, said machine including a house 15 in which the operating mechanism is located, and an operator's cab 16 is provided on the front end of the machine. A superstructure 17 forms a part of the full revolving machine and a structural boom 18 is pivotally attached thereto at the point 19, and when the machine is being used for handling fragmentary material with a grab bucket, this boom is disposed horizontally and as shown in solid lines in Fig. 1 of the drawings, and is held in this position by means of a boom hoist rope 20 anchored to the yoke 21, thence leading around the sheave 22 provided on the bridle 23, thence around the sheave 24, thence around companion sheaves 22, thence over the sheave 25, and thence leading down and being wound on a boom hoist drum 26 located in the cab, and which is operated from a suitably controlled electric motor 27 in the usual manner; so that the boom can be adjusted about the pivot point 19, or held in any desired position.

The boom is suitably braced to support a predetermined load, and trackways 28 are provided thereon as shown, and on which a trolley T is mounted for travel in a manner to be presently described.

The trolley T can be of any desired design and in the present instance comprises a frame 29 provided with spaced apart axles 30 and 31 respectively, and on which track engaging wheels 32 are provided for travel on the trackways 28. A racking unit R controls the movement of the trolley and includes a drum 33 drivingly connected to a motor 34, cables 35 and 36 are anchored on this drum 33 and are oppositely wound, the cable 35 being wound over and leading over a sheave 37, thence outwardly and over a sheave 38 provided on the end of the boom, and thence being anchored to the front end of the trolley. The cable 36 is wound under, thence leading up and over a sheave 39, and thence being anchored to the opposite end of the trolley T, thus it will be obvious that rotation of the drum 33 in one direction draws the trolley towards the machine, while rotation in the opposite direction draws it outwardly towards the outer end of the boom.

The hoisting unit H is mounted in the house 15 and includes winding drums 40 and 41 respectively, and these drums are drivingly connected to motors 42 and 43 as usual, a shell rope 44 is anchored and wound on the drum 40, thence leading upward and over sheaves 45, thence outwardly and around the sheaves 46, and thence around the sheaves 47 which is mounted on the shaft 48 which forms a part of the trolley; thence the rope leads down around the bucket sheave 49 and thence up and over sheave 50, and thence being dead ended at 51.

The bucket closing rope system is illustrated in Fig. 9, the rope 52 being wound on drum 41, thence leading up and over sheave 53, thence outwardly and over sheave 54 provided on the outer end of the boom, and thence over sheave 55, thence down and around sheaves 56 and 57 and thence up and over sheave 58, and thence being dead ended at 59 as usual.

In Fig. 10 of the drawings I have illustrated the system utilized when the machine is used as a boom crane for handling machinery, structural shapes, and long, heavy, bulky objects, in this arrangement the trolley T is parked at the inner end of the boom, and as indicated in Fig. 11 an opening 60 being provided in the side flanges of the track 28, and a bolt or pin 61 projects through said opening and through similar openings 62 provided in the trolley frame so that the trolley is held against movement when the boom is manipulated.

The boom is mounted for swinging in the same manner as is the boom on a boom crane, a rope 63 being wound on the drum 64 thence leading up and over a sheave 65, thence out and over the sheave 46 provided on the end of the boom, thence leading down and around the sheave 66 to which the hook 67 is attached as usual, thence the rope leads up and is dead ended as at 68, and it will be obvious that the hook can be raised or lowered by controlling the direction of rotation of the drum 64.

Brief resume of operation when machine is utilized for handling materials of a fragmentary classification.

In practice and with the boom in position as shown in solid lines in Figs. 1 and 4 of the drawings the drum 33 is driven to traverse the trolley T on the track boom 28 and "spot" it over the hatch, (not shown) of a ship; the drum 40 is then actuated to pay out the rope 44 and lower the bucket G onto the material to be transferred, and when the bucket is loaded, the drum 41 is actuated to wind the rope 52 and close the bucket, and the drum 40 is again actuated to hoist the bucket to position directly beneath the boom and as shown in solid lines in Fig. 1. The racking drum 33 is now actuated to pay out on the rope 35 and wind in on the rope 36 to move the trolley and the suspended bucket in towards the machine to spot it over the receiving hopper 10 and as indicated in broken lines in Fig. 1, the drum 41 is next released to permit the rope 52 to unwind so that the bucket will open and discharge its contents into said hopper which is provided with electrically operated gates (not shown). The weigh hopper 11 is then positioned beneath the receiving hopper 10 and the contents are discharged thereinto; the weight of the load is then recorded, and the weighing hopper is then moved, on the tracks 13, to position over one of the transfer cars D, so that the hopper contents can be discharged thereinto; this completes the cycle of operation which is successively repeated until the transfer of materials is completed.

When it is desired to use the machine for handling general cargo such as machinery, steel work, timbers, etc., the bucket G is stowed on the platform 68 of the house as indicated in broken lines at X on Fig. 1; this places the bucket out of the zone of operation of the other mechanism, and with the trolley T located and locked at the inner end of the boom as shown in broken lines in Fig. 10.

The machine is now ready for conversion to and operation as a boom crane, and the boom hoist drum 26 is first actuated to wind the boom hoist cable 20 to elevate the boom as desired and as indicated in broken lines in Fig. 1 of the drawings, after which the auxiliary drum 64 is actuated to wind or pay out the rope 63 to raise or lower the cargo hook 67 so that heavy, long, or bulky objects, packages, or machinery can now be handled as desired, there are no legs, props, or other obstructions to interfere with the operation, and the machine will handle any and all work ordinarily performed by a conventional boom crane.

By rotating the machine F, the boom 18 may be disposed at any desired angle with respect to the dock or ship, so that it can operate from either side or lengthwise of the dock, and while in the present instance I have shown the machine unloading a ship, it will be understood that loading is accomplished in the same manner.

From the foregoing description, it will be obvious that I have perfected a very simple, practical, and comparatively inexpensive combination machine for handling bulk or general cargo material.

What I claim is:

1. A system of the character described for handling a variety of materials comprising, in combination, a plurality of transfer cars, a mobile carriage spanning the cars and a freely revolvable crane structure mounted thereon, a superstructure forming part of said crane structure, a radially extending horizontally disposed load transfer boom pivotally connected to said superstructure, a material transfer trolley and bucket supported by said track boom, power means including individual hoisting and traversing means associated with said boom for hoisting the material and moving said trolley along the boom, and means on said crane structure for supporting said bucket when the boom is elevated at an angle and the machine used as a boom crane.

2. A system of the character described for handling a variety of materials comprising, in combination, a mobile carriage mounted on a dock or support, a rotatable crane mounted on said carriage, a superstructure on said base including a radially extending transfer track boom pivotally connected thereto and adjustable thereon, a material transfer trolley supported by the track boom, power means including independent hoisting and traversing mechanism associated with said boom for hoisting the material and transversing the transfer trolley and material bucket along said boom, and an extension on the crane base to accommodate a bucket when the machine is being used as a boom crane.

3. A system of the character described comprising a mobile carriage adapted to be mounted for travel on a dock or supporting structure, and spanning a plurality of tracks and transfer cars, a revolvable crane structure mounted on said carriage, a track boom pivotally connected to said crane and including a trolley, said boom being adapted in one position to serve as a track for traversing the trolley and material being handled for transfer to a selected railroad car or receptacle, and in another position to serve as a boom crane for handling a variety of materials and for transferring materials into or out of said cars, and a platform extension on said crane structure for accommodating a bucket or the like when the machine is being used as a boom crane.

4. A material handling system of the character described comprising in combination, a mobile carriage adapted to be mounted for travel on a dock or other supporting structure and spanning a plurality of tracks and transfer cars, a revolvable crane base mounted on said carriage, a superstructure on said base, a track boom pivotally connected to said superstructure and adapted in its horizontal position to serve as a track for traversing a trolley and bucket for the material being handled, for transfer to a car or receptacle, and in elevated position to serve as a boom crane for handling a variety of materials, an extension on said crane base to accommodate a bucket when the machine is being used as a boom crane, and independent means for elevating said boom.

ERNEST W. TAYLOR.